United States Patent [19]
Brennan et al.

[11] 3,934,520
[45] Jan. 27, 1976

[54] CHARCOAL STARTER

[75] Inventors: Martin J. Brennan; Vernon D. Klawonn, both of Bethel Park; Edward K. Browne, Pittsburgh, all of Pa.

[73] Assignee: K & B Industries, Inc., Bethel Park, Pa.

[22] Filed: Oct. 10, 1974

[21] Appl. No.: 513,767

[52] U.S. Cl. .............................. 110/1 F; 126/25 B
[51] Int. Cl.² ........................................ F23Q 13/00
[58] Field of Search ..................... 110/1 F; 126/25 B

[56] References Cited
UNITED STATES PATENTS

| | | | |
|---|---|---|---|
| 3,062,200 | 11/1962 | Miller | 126/25 |
| 3,121,408 | 2/1964 | Haning | 126/25 |
| 3,177,826 | 4/1965 | Cohen | 110/1 |
| 3,191,556 | 6/1965 | Hottenroth et al. | 110/1 |
| 3,216,379 | 11/1965 | Durfee | 126/25 |
| 3,296,984 | 1/1967 | Durfee | 126/25 |
| 3,453,975 | 7/1969 | Gunter | 110/1 |
| 3,739,732 | 6/1973 | Graham | 126/25 |
| 3,848,577 | 11/1974 | Storandt | 126/25 |

Primary Examiner—Kenneth W. Sprague
Attorney, Agent, or Firm—Stanley J. Price, Jr.

[57] ABSTRACT

A charcoal starter used with a conventional charcoal barbecue grill for outdoor cooking includes a tapered housing formed by interconnecting quadrilateral sidewalls that are arranged to rest vertically on the supporting surface of the charcoal grill. The sidewalls define open top and bottom portions with the area of the bottom opening being greater than the area of the top opening. A row of air inlet apertures and a pair of openings are provided in each of the sidewalls adjacent the lower end portions and the upper end portions thereof respectively. A handle member is detachably engageable with a pair of openings for lifting the housing into and out of position on the barbecue grill supporting surface. A grate having a plurality of apertures extending therethrough is positioned in the housing and is supported at an elevation above the sidewall air inlet apertures by support members secured to the grate. Ignitable material such as paper is received within the housing below the grate, and charcoal briquets are supported on the grate. The combustion gases from the burning of the ignitable material flow upwardly through the grate to thereby ignite the charcoal. The handle also functions to lift the grate from the grill by engagement with one of the apertures in the grate and to disperse the heated charcoal briquets into the grill. After use the charcoal starter is conveniently stored by extending the handle down through the open top portion of the housing to engage the grate by the apertures. Vertically lifting the grate by the handle within the housing urges the edge portions of the grate into frictional engagement with the housing sidewalls. Thus, by suspending the handle above the housing the grate remains secured to the housing.

6 Claims, 7 Drawing Figures

U.S. Patent  Jan. 27, 1976  3,934,520
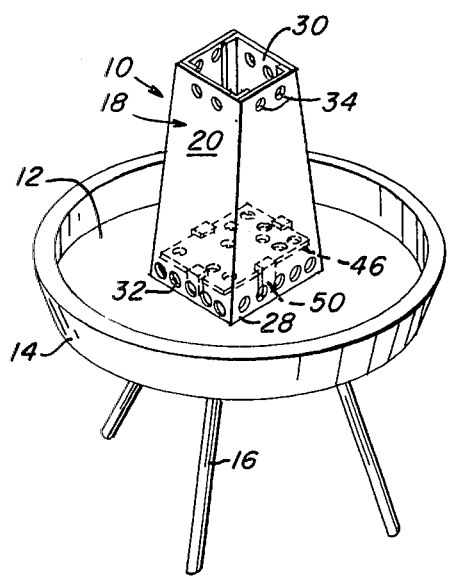
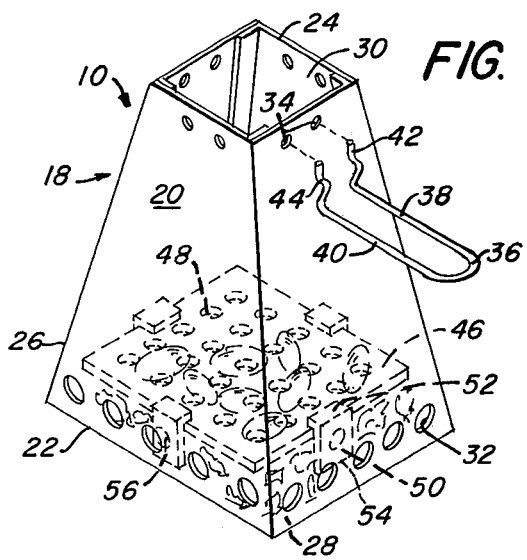
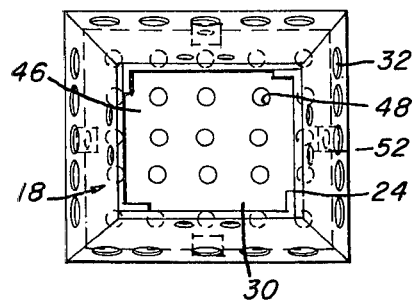
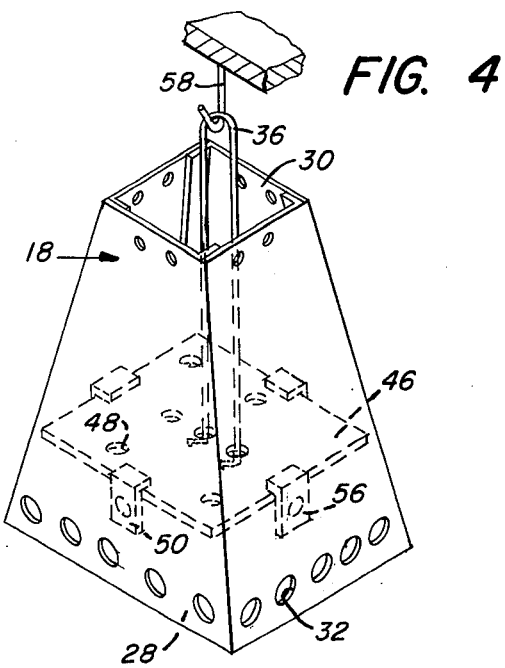
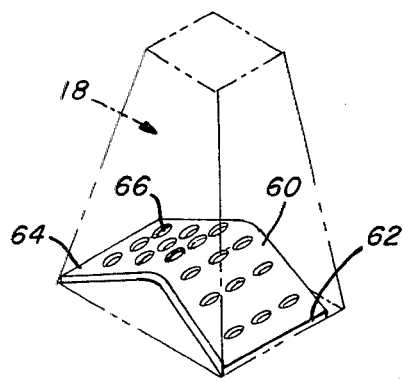
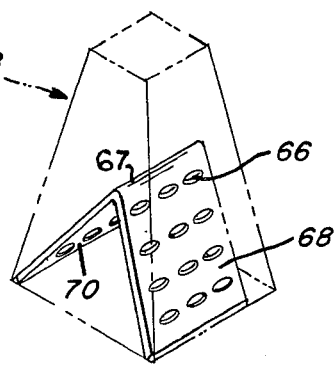
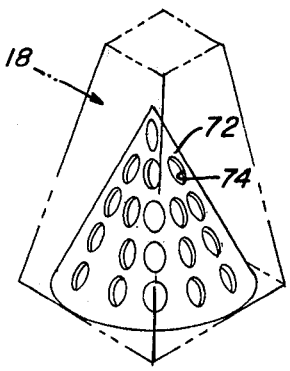

CHARCOAL STARTER

BACKGROUND OF THE INVENTION

1. Field of the Invention

This invention relates to a charcoal starter for use in igniting charcoal briquets burned in a barbecue grill and more particularly to a charcoal starter that is efficiently operable to ignite charcoal briquets in a barbecue grill without the aid of starter fluid and is efficiently arranged as a unitary assembly during storage.

2. Description of the Prior Art

Apparatus for igniting charcoal in a conventional barbecue grill for use in outdoor cooking is well known in the art. U.S. Pat. Nos. 3,116,704 and 3,167,040 disclose charcoal starters that include a tapered tubular housing having a plurality of air intake apertures provided at the lower portion thereof and adapted to rest upon the pan of a conventional charcoal barbecue grill. A grate comprising a plurality of parallel supporting rods extending through openings in the wall of the tubular housing is arranged to partition the tubular housing into a first portion for receiving ignitable material positioned below the grate and a second upper portion for supporting the charcoal briquets to be ignited on the grate. The combustion of the ignitable material when ignited by a match creates an intense heat below the charcoal briquets supported on the grate. The combustion of the charcoal briquets is aided by the draft of air flowing through the apertures in the tubular housing and upward through the grate and out of the open upper end portion of the tubular housing. After the charcoal briquets have become ignited the grate is disengaged from connection with the tubular housing allowing the burning charcoal briquets to be deposited within the pan of the charcoal grill.

U.S. Pat. No. 3,167,040 illustrates a handle that is pivotally secured to the upper end portion of the tubular housing and has a lower end portion that is releasably engageable with the grate within the tubular housing. When the charcoal briquets have become ignited the handle is released from engagement with the grate to permit the grate to fall free at one end portion within the tubular housing so that the ignited charcoal briquets will fall into the pan of the charcoal grill. Further, the handle is operable to lift the tubular housing having the grill connected thereto away from the pan of the charcoal grill.

A combination grate and chimney for igniting charcoal briquets in a conventional charcoal grill is disclosed in U.S. Pat. No. 3,296,984. The triangular grate composed of a grid of longitudinal wires supports the chimney, and the area above the grate within the chimney is filled with charcoal briquets. A combustible material is placed below the grate, and burning the combustible material ignites the briquets within the chimney which provides updraft through the mass of briquets on the grate. One the briquets have become ignited removing the chimney from the grate distributes the ignited briquets within the pan of the charcoal grill.

Fuel igniters are disclosed in U.S. Pat. Nos. 1,959,473 and 3,453,975 and include a chimney of a selected geometric configuration having a grate positioned within the chimney to partition the chimney into a first section for receiving the fuel such as charcoal briquets to be ignited and a second section positioned below the grate for receiving combustible material that upon ignition produces intense heat that ignites the charcoal briquets. Spaced apart openings provided in the lower portion of the chimney admit air thereto for increasing the rate of combustion. U.S. Pat. No. 3,240,172 discloses a charcoal briquet starter having an open-ended cylindrical body with a handle secured thereto and provided with vent holes around the lower end portion of the body. The vent holes provide a draft that promotes the ignition of charcoal within the interior of the cylindrical body. When the briquets have been ignited lifting the cylindrical body by the handle permits the hot briquets to be spaced out in the barbecue grill.

There is need for an apparatus for starting combustion of charcoal briquets in a conventional barbecue grill which efficiently and safely ignites the charcoal briquets without the aid of a liquid starter fuel and is further operable to disperse the ignited charcoal briquets within the charcoal grill and is conveniently stored after use. While it has been suggested to provide a chimney of a tubular configuration having a grate positioned therein for supporting the charcoal to be ignited above the ignitable material, the prior art devices require dispersing of the ignited charcoal briquets in the barbecue grill by either lifting the chimney by a handle that is integral with the chimney and exposed to the intense heat of both the ignited charcoal and the ignitable material or by manipulating the heated grate to disconnect it from the chimney so that the ignited charcoal falls upon the pan of the charcoal grill.

SUMMARY OF THE INVENTION

In accordance with the present invention there is provided a charcoal starter that includes a tapered housing that is arranged to rest vertically on a supporting surface and is formed by interconnecting quadrilateral sidewalls to define open top and bottom portions with the bottom opening being larger than the top opening. A plurality of spaced apart air inlet apertures extend through each of the sidewalls at the lower portions thereof. Openings extend through each of the sidewalls at the upper portions thereof. A handle member having end portions detachably engageable with the openings in the upper end portions of the sidewalls is adaptable for lifting the housing into and out of position on the supporting surface. A support member retains the charcoal within the tapered housing at an elevation above the air inlet apertures of the housing sidewalls. The charcoal supporting member includes a plurality of apertures extending therethrough and has a diagonal dimension less than the diagonal dimension of the lower end portion of the housing and greater than the diagonal dimension of the upper end portion of the housing.

Ignitable material is positioned beneath the charcoal supporting member with the charcoal positioned on the upper surface of the supporting member. Combustion of the ignitable material is prompted by the flow of air through the air inlet apertures of the housing sidewalls. Thus, an upward draft of air and combustion gases flow through the apertures of the supporting member into intimate contact with the charcoal to raise the temperature of the charcoal above its kindling temperature. In addition the intense heat generated by the ignitable material is confined within the chimney by the upwardly tapering sidewalls. After the charcoal has ignited the handle member is engaged to the openings in one of the sidewalls to lift the chimney from the supporting structure. Hereafter the handle member is also utilized to extend through the apertures in the charcoal supporting member to lift the charcoal supporting member from the supporting structure and thereby disperse the ignited charcoal thereon.

Provision is made to secure the charcoal supporting member to the housing by the handle member for storage of the charcoal starter as a unitary assembly. The handle member is extended downwardly through the open top portion of the housing to pass the handle end portions through the apertures of the charcoal supporting member to thereby secure the handle member to the supporting member. The handle member is vertically raised out of the housing open top portions lifting the charcoal supporting member within the housing. When the supporting member reaches a position in the housing where the diagonal dimension of the supporting member is equal to the diagonal dimension of the housing the edge portions of the supporting member frictionally engage the housing sidewalls to resist further upward movement of the supporting member within the housing. Thus, by supporting the handle member from an elevated support to retain an upward lifting force upon the supporting member the weight of the housing exerts a downward force upon the supporting member to thereby secure the supporting member to the housing by the handle member.

Accordingly, the principal object of the present invention is to provide a charcoal starter for use with a conventional barbecue grill and operable to efficiently support a quantity of charcoal at an elevation above the barbecue grill for ignition by combustible material without the need for liquid hydrocarbon starter fuel.

Another object of the present invention is to provide a charcoal starter that includes a tapered housing that surrounds a grate for supporting a quantity of charcoal above ignitable material and is easily maneuvered into place on the barbecue grill by a detachably engageable handle member.

Another object of the present invention is to provide a charcoal starter that includes a handle member that is detachably engageable to the chimney for lifting the chimney from the charcoal grill when heated to an elevated temperature by the ignition of the charcoal and is further adaptable as an implement in dispersing the charcoal from the grate into the bowl of the barbecue grill.

A further object of the present invention is to provide a charcoal starter that includes a chimney, a grate and a handle member that may be efficiently assembled as a unitary structure for storage of the charcoal starter when not in use.

These and other objects of the present invention will be more completely disclosed in the following specification, the accompanying drawings and the appended claims.

BRIEF DESCRIPTION OF THE DRAWINGS

FIG. 1 is a perspective view of the charcoal starter positioned within the bowl of a conventional barbecue grill for igniting charcoal briquets contained therein in accordance with the present invention.

FIG. 2 is an enlarged isometric view of charcoal starter, illustrating the arrangement for igniting the charcoal briquets by the waste material positioned below the grate and the handle that is detachably engageable with the sidewalls of the chimney.

FIG. 3 is a top plan view of the charcoal starter, illustrating the grate positioned within the chimney having an open upper end portion with a diagonal dimension less than the diagonal dimension of the grate.

FIG. 4 is an isometric view of the charcoal starter, illustrating the arrangement for securing the grate to chimney by the handle for convenient storage of the charcoal starter when not in use.

FIGS. 5–7 are schematic representations of the charcoal starter, illustrating additional embodiments of the grate for supporting the charcoal briquets to be ignited within the chimney by ignitable material.

DESCRIPTION OF THE PREFERRED EMBODIMENTS

Referring to the drawings and more particularly to FIGS. 1–3, there is illustrated the charcoal starter generally designated by the numeral 10 adapted to be positioned within a bowl 12 and a conventional charcoal barbecue grill 14 that is supported by leg members 16 secured to the bottom surface of the bowl 12. The charcoal starter 10 comprises a tapered housing or chimney 18 that rests upon the surface of the bowl 12. The chimney 18 includes interconnecting quadrilateral sidewalls 20. The sidewalls 20 are fabricated from an incombustible noncorroding sheet material such as stainless steel or aluminum and are secured together at their adjacent edge portions by suitable fastening means. Each of the sidewalls 20 includes a lower edge 22 that is parallel to an upper edge 24 with upwardly converging side edges 26 connecting the lower and upper edges 22 and 24. With this arrangement, the chimney 18 forms a pyramid-like shape having an open rectangular base portion 28 and an open rectangular top portion 30 that has an area smaller than that of the base portion 28.

Each of the chimney sidewalls 20 includes a row of spaced air inlet apertures 32 or a single elongated slot (not shown) that is arranged adjacent and parallel to the lower edge portion 22 of each of the sidewalls 20. Located adjacent the upper edge portion 24 of each of the chimney sidewalls 20 are pairs of spaced openings 34. A handle 36 having arm members 38 and 40 with bent end portions 42 and 44 respectively, is adapted to be detachably engageable with the sidewalls 20. The bent end portions 42 and 44 extend through the selected pair of the openings 34 and abut the inside surface of a sidewall 20 to permit lifting of the chimney 18 by the handle 36 into and out of position on the supporting surface of the barbecue grill bowl 12. Thus, the provision of the detachable handle 36 facilitates handling of the heated chimney 18 once the charcoal briquets are ignited in a manner hereinafter explained.

A grate generally designated by the numeral 46 is adapted to be positioned within the chimney 18 for supporting the charcoal briquets above the surface of the bowl 12. As illustrated in FIGS. 1–3 the grate 46 is a rectangular plate having a plurality of parallel spaced rows of apertures 48 extending through the plate. The grate 46 is maintained within the chimney 18 at an elevation above the air inlet apertures 32 by support members 50. Each of the support members 50 includes an upper extension 52 that overlaps and is secured intermediately to the grate 46. A lower extension 54 depends vertically downwardly from each of the upper extensions 52 having the lower end portion of extension 54 resting upon the supporting surface of the barbecue grill bowl 12.

Each of the lower extensions 54 is provided with an aperture 56 that facilitates the flow of combustion air through the air inlet apertures 32 and below the grate 46. Accordingly, the flow of air through the air inlet apertures 32 is not impeded by the lower extensions 54 of the support members 50. With this arrangement the grate 46 divides the interior volume of the chimney 18 into a first section for receiving ignitable material below the grate 46 on the grill bowl 12 and a second section for supporting charcoal to be ignited on the grate 46.

The charcoal is ignited within the bowl 12 of the barbecue grill 14 by initially placing the grate 46 on the supporting surface of the bowl 12 in overlying relationship with ignitable material, such as paper or other waste material. The chimney 18 is then positioned on the bowl 12 in surrounding relationship with the grate 46. Charcoal briquets are then introduced into the chimney 18 through the open top portion 30 and are collected within the chimney 18 on the upper surface of the grate 46.

The ignitable material below the grate 46 is suitably ignited as by a lighted match. The draft of air entering the chimney 18 through the air inlet apertures 32 is directed below the grate 46 to promote combustion of the ignitable material. The combustion gases circulate upwardly within the chimney 18 through the apertures 48 in the grate 46. The pyramid-like shape of the chimney 18 promotes flow of the combustion gases into intimate contact with the charcoal briquets. The intense heat of combustion of the ignitable material is confined within the chimney 18 to thus raise the temperature of the charcoal briquets above its kindling temperature without the aid of liquid hydrocarbon starter fuel.

After the charcoal briquets have become ignited the end portions 42 and 44 of the handle 36 are extended through the openings 34 in one of the sidewalls 20 to thereby lock the handle 36 to the chimney 18. The chimney 18 is then lifted by the handle 36 from surrounding relationship with the grate 46 avoiding contact with the chimney 18 heated by the combustion of the charcoal briquets. With the chimney 18 removed from surrounding relationship with the grate 46 the charcoal briquets are then dispersed from the grate 46 into the barbecue grill bowl 12 by engaging one of the end portions of the handle 36 with an aperture 48 of the grate 46 (preferably an aperture adjacent an edge portion of the grate 46). By vertically lifting the grate 46 the ignited charcoal briquets fall upon the surface of the bowl 12. The handle 36 may then be utilized to suitably arrange the ignited charcoal briquets within the bowl 12. Thus the handle 36 functions both to lift the heated chimney 18 and grate 46 from the barbecue grill 14 and to arrange the ignited charcoal briquets within the bowl 12.

After use the chimney 18, the grate 46 and the handle 36 may be conveniently stored as a unitary assembly by the arrangement illustrated in FIG. 4. With the grate 46 positioned within the chimney 18 the end portions 42 and 44 of the handle 36 are extended downwardly through the open top portion 30 of the chimney 18. The handle end portions 42 and 44 are passed through a selected pair of apertures 48 in the grate 46 to thereby securely engage the handle 36 to the grate 46. The handle 36 is raised vertically and out of the open top portion 30 of the chimney 18. In this manner, the grate 46 is lifted by the handle 36 upwardly within chimney 18 until the edge portions of the grate 46 are urged in abutting relation with the sidewalls 20 of the chimney 18.

As hereinabove stated and as illustrated in FIG. 3, the diagonal dimension of the grate 46 is less than the maximum diagonal dimension of the chimney at the base portion 28 and is less than the minimum diagonal dimension of the chimney at the top portion 30. Thus, upward movement of the grate 46 within the chimney 18 is restrained between the base and top portions 28 and 30 at a point where the diagonal dimension of the chimney 18 is equal to the diagonal dimension of the grate 46. As long as the grate 46 is maintained in this position within the chimney 18 the grate 46 and the chimney 18 are connected as a unitary assembly by the handle 36.

By suspending the closed end portion of the handle 36 above the chimney 18, such as by a hook 58 that may be secured to a wall or any other supporting structure, an upward lifting force is exerted upon the grate 46 to maintain the grate engaged to the chimney sidewalls 20. The weight of the chimney 18 acts downwardly against the upward force applied to the grate 46 by the hook 58 to retain the edge portions of the grate 46 in frictional engagement with the sidewalls 20. As illustrated in FIG. 4, the grate 46 is maintained in substantially horizontal position within the chimney 18 by the handle 36; however, one edge portion of the grate 46 may be positioned at an elevation above an opposite edge portion and still maintain the grate edge portions in frictional engagement with the chimney sidewalls 20.

Alternative embodiments of the grate configuration of FIG. 2 are illustrated in FIGS. 5-7. Referring to FIG. 5 an arcuate grate 60 is illustrated having end portions 62 and 64 that depend downwardly from the crown of the grate 60. The end portions 62 and 64 are arranged to abut the lower edge portions of opposed sidewalls 20 of the chimney 18. The arcuate grate 60 includes a plurality of apertures 66 through which the hot combustion gases pass. As with the rectangular grate 46 illustrated in FIG. 2, the arcuate grate 60 partitions the chimney 18 into a first section beneath the grate 60 for receiving ignitable material and a second section above grate 60 for supporting the charcoal briquets to be ignited.

In a similar arrangement, a triangular shaped grate 67 having leg members 68 and 70 is illustrated in FIG. 6. The leg members 68 and 70 are arranged to abut opposed sidewalls 20 of the chimney 18. With this arrangement the triangular grate 68 divides the interior of the chimney 18 into a first section for receiving charcoal briquets on the upper surface of the grate 68 and within the space defined by the upper surface of the grate 68 and the chimney sidewalls 20 and a second section beneath the grate 68 for receiving ignitable material.

With both embodiments illustrated in FIGS. 5 and 6 the diagonal measurement extending between opposite corners of the end portions of each of the grates 60 and 68 is less than the diagonal dimension of the open base portion and less than the diagonal dimension of the open top portion of the chimney 18. Thus, the handle 36 is adapted to engage the apertures of either grate 60 or 68 positioned in the chimney 18 so that upon lifting the grate 60 or 68 by the handle 36 the grate edge portions will frictionally engage the chimney sidewalls 20 and secure the respective grate to the chimney 18 by the handle 36 suspended from an elevated supporting structure.

Referring to FIG. 7, there is illustrated a conical grate 72 that is positioned within the chimney 18. The conical grate 72 has a hollow interior portion and apertures 74 extending through the grate 72. The circular base portion of the grate 72 is positioned adjacent the lower edge portions of the chimney sidewalls 20 to position the chimney 18 into a first section confined within the conical grate 72 for receiving ignitable material. A second section is formed between the outer surface of the grate 72 and the inside surface of the sidewalls 20 for receiving the charcoal briquets to be ignited. As hereinabove discussed ignitiion of the ignitable material within the conical grate 72 produces hot gases which are directed upwardly through the apertures 74 and the chimney 18 to heat the charcoal briquets so that they in turn ignite. In addition, the handle 36 is adaptable to engage the apertures 74 and lift the grate 72 upwardly within the chimney 18 to engage the sidewalls 20 for storage of the chimney 18, handle 36 and grate 72.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A charcoal starter comprising,
    a tapered housing arranged to rest vertically on a supporting surface and being formed by interconnecting quadrilateral sidewalls to define an open top portion and an open base portion with said base portion having an area greater than said top portion,
    a plurality of spaced apart air inlet apertures extending through each of said sidewalls at the lower portions thereof and openings extending through each of said sidewalls at the upper portions thereof,
    handle means having end portions detachably engageable with said openings of one of said housing sidewalls for lifting said housing into and out of position on said supporting surface,
    means for supporting charcoal to be ignited within said housing above said air inlet apertures of said housing sidewalls, said charcoal supporting means positioned for vertical movement within said housing,
    said handle means including means for securing said charcoal supporting means within said housing for storage of said charcoal starter when said handle means is detached from engagement with said openings in one of said sidewalls, and
    said charcoal supporting means having a plurality of apertures extending therethrough and a diagonal dimension greater than the diagonal dimension of said open top portion of said housing.

2. A charcoal starter as set forth in claim 1 which includes,
    said handle means end portions arranged to engage said openings of one of said housing sidewalls to lift said housing from surrounding relationship with said charcoal supporting means.

3. A charcoal starter as set forth in claim 1 in which said charcoal supporting means includes,
    a plate member having support members secured to said depending downwardly therefrom to horizontally position said plate member within said housing above said supporting surface,
    said plate member being supported by said support means independently of said housing above said air inlet apertures.

4. A charcoal starter as set forth in claim 3 which includes,
    said plate member having a rectangular configuration with a diagonal dimension less than the diagonal dimension of said housing open base portion and greater than the diagonal dimension of said housing open top portion such that upward movement of said plate member within said housing urges the edge portions of said plate member into abutting relation with sidewalls of said housing open top portion.

5. A charcoal starter as set forth in claim 1 in which said means for securing said charcoal supporting means within said housing for storage includes,
    said handle means having arm members with said end portions and a closed end portion,
    said arm members being operable to extend downwardly through said housing open top portion and having said end portions arranged to engage certain of said apertures in said charcoal supporting means,
    said arm members operable to be supported by said closed end portion above said housing to raise said charcoal supporting means upwardly within said housing to urge said charcoal supporting means into engagement with said housing sidewalls and thereby secure said charcoal supporting means to said housing.

6. A charcoal starter as set forth in claim 1 in which said charcoal supporting means includes,
    a conical housing having a plurality of apertures extending therethrough and a circular base portion arranged to abut the lower portions of said sidewalls within said housing to define a section between said sidewalls and the surface of said conical housing for retaining charcoal to be ignited,
    said circular base portion having a diameter less than the diagonal dimension of said housing open base portion and greater than the diagonal dimension of said housing open top portion.

* * * * *